United States Patent [19]
Renwick

[11] 4,291,638
[45] Sep. 29, 1981

[54] AGRICULTURAL IMPLEMENTS

[75] Inventor: Peter J. Renwick, Andover, England

[73] Assignee: Craven Tasker (Andover) Limited, Hampshire, England

[21] Appl. No.: 70,652

[22] Filed: Aug. 28, 1979

[30] Foreign Application Priority Data

Aug. 30, 1978 [GB] United Kingdom ............ 35112/78

[51] Int. Cl.³ .............................................. A01C 5/00
[52] U.S. Cl. ................................... 111/61; 172/462; 172/619; 172/629; 172/657
[58] Field of Search ...................... 111/52, 53, 54, 55, 111/56, 57, 58, 59, 60, 61, 62, 63, 64, 65, 66, 73, 80, 85; 172/619, 629, 631, 624, 626, 627, 625, 462, 488, 500, 551, 573, 458, 497, 470, 473, 614, 615, 616, 617, 641, 657, 643

[56] References Cited

U.S. PATENT DOCUMENTS

| 293,389 | 2/1884 | Wishart et al. | 111/54 X |
|---|---|---|---|
| 2,640,405 | 6/1953 | Wheeler | 111/54 X |
| 2,924,188 | 2/1960 | Hodges | 111/62 |
| 2,947,372 | 8/1960 | Olson | 172/631 X |
| 3,117,541 | 1/1964 | Todd et al. | 111/54 |
| 4,031,963 | 6/1977 | Poggemiller et al. | 111/85 |
| 4,078,504 | 3/1978 | Tye | 111/85 X |
| 4,116,140 | 9/1978 | Anderson et al. | 111/85 X |
| 4,149,475 | 4/1979 | Bailey et al. | 111/85 X |
| 4,196,679 | 4/1980 | Moore | 111/85 X |

FOREIGN PATENT DOCUMENTS 403746 10/1924 Fed. Rep. of Germany ...... 172/629

Primary Examiner—James R. Feyrer
Attorney, Agent, or Firm—Oblon, Fisher, Spivak, McClelland & Maier

[57] ABSTRACT

The present invention provides in an agricultural ground treating device particularly but not exclusively a seed drill arranged to be towed over the ground and having a plurality of ground engaging implements, means for causing all of the implements to engage the ground with a substantially equal force.

Preferably the means to equalizing the forces comprises a pivotal beam arrangement in which the implements are movably mounted on the chassis of the device and connected in pairs at each end of an associated balance beam, these balance beams are pivotally mounted at their mid points on respective ends of further balance beams which are mounted by their mid points at respective ends of yet further balance beams, and so on according to the number of implements on the device, the final balance beam or final pair of balance beams being connected to means on the chassis of the device for urging them, and the implements connected thereto towards the ground. Preferably the loading means is further arranged to raise the implements clear of the ground when required.

19 Claims, 14 Drawing Figures

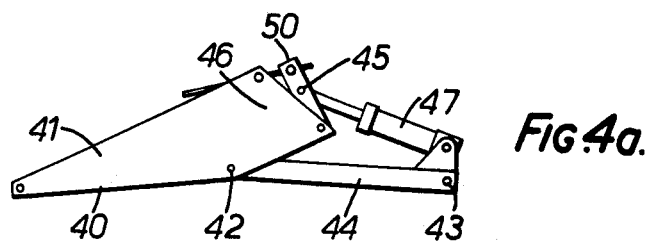
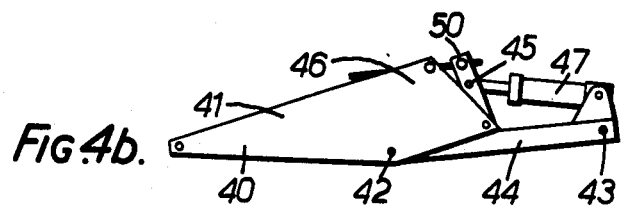
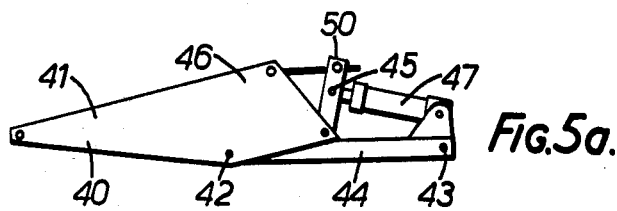
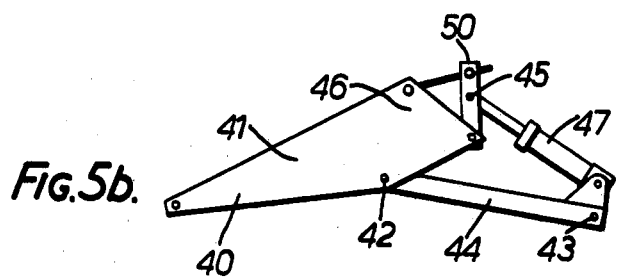
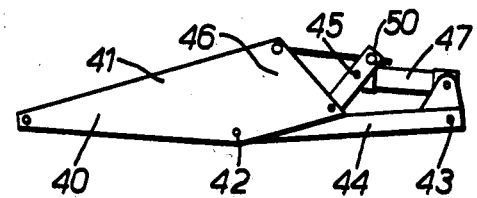
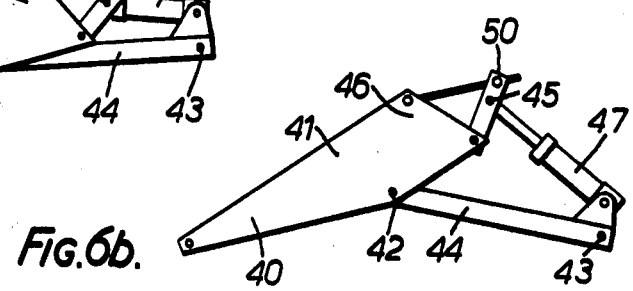

AGRICULTURAL IMPLEMENTS

BACKGROUND OF THE INVENTION

This invention relates to agricultural ground treating devices, and while it is particularly described in this specification in its application to seed drills for the direct drilling of seeds into the ground, the invention finds application in other similar ground treating devices which are arranged to be towed over the ground and have a plurality of ground engaging implements.

In agricultural devices having a number of ground engaging implements, when the device is towed over uneven ground problems arise from a lack of uniformity in the engagement of the implement on the ground. In the particular example of a seed drill, the device typically comprises a chassis arranged with wheels so that it can be towed over the ground and a number of ground engaging implements in the form of individual seed drilling units carried on the chassis to engage the ground. These units include means for cutting a slot or furrow in the ground and implanting seeds at spaced intervals along the furrow. The means for cutting the furrows are forced into the ground with a force dependent upon the depth to which the particular furrow is required and are often provided with surface engaging skids to assist in the control of the depth of cut. In existing machines all the cutting devices are loaded by a common mechanism to be forced into the ground, and thus where the device is towed across uneven ground difficulties arise in some of the cutting devices tending to cut deeper than others resulting in a lack of uniformity in the sowing of the seeds in the ground.

Accordingly the present invention seeks to provide improved means for raising and lowering the ground engaging implements on such an agricultural device and to control the force with which the implements engage the ground.

SUMMARY OF THE INVENTION

Accordingly, in one aspect, the present invention provides in an agricultural ground treating device particularly but not exclusively a seed drill arranged to be towed over the ground and having a plurality of ground engaging implements, means for causing all of the implements to engage the ground with a substantially equal force.

Preferably the means to equalising the forces comprises a pivotal beam arrangement in which the implements are movably mounted on the chassis of the device and connected in pairs at each end of an associated balance beam, these balance beams are pivotally mounted at their mid points on respective ends of further balance beams which are mounted by their mid points at respective ends of yet further balance beams, and so on according to the number of implements on the device, the final balance beam or final pair of balance beams being connected to means on the chassis of the device for urging them, and the implements connected thereto towards the ground. Preferably the loading means is further arranged to raise the implements clear of the ground when required.

In another aspect the present invention provides in such an agricultural ground treating device, particularly but not exclusively a seed drill, arranged to be towed over the ground and having a plurality of ground engaging implements, means for raising and lowering the implements relative to the ground comprising a bell-crank like member pivotally mounted on the chassis and having one arm connected to the implements whereby pivotal movement of the bell-crank raises or lowers the implements relative to the ground, and having the other arm pivotally connected at a pivot point thereon to a fluid pressure operated piston or cylinder device mounted to achieve such pivotal movement of the bell-crank like member, the distance of said pivot point on the other arm from the pivot point of the bell-crank like member on the chassis being adjustable to adjust the scope of movement of the implements.

Preferably the means for raising and lowering the implements includes a link member pivotally mounted at one end on the chassis at the same point, or an adjacent point, to the bell-crank like member, and the piston and cylinder device is operative between the other end of the link member and said pivot point, a number, preferably half, of the implements being connected to the other end of the link member whereby pivotal movement of the link member raises or lowers those implements.

Preferably the pivot point on the other arm of the bell-crank like member is provided on an adjustment arm which is pivotally mounted on the bell-crank like member.

BRIEF DESCRIPTION OF THE DRAWINGS

In order to promote a fuller understanding of the above, and other aspects of the present invention, an embodiments will now be described by way of example only, with reference to the accompanying drawings, in which:

FIGS. 4, 5 and 6 (a and b) show various positions of the mechanism shown in FIG. 3.

DESCRIPTION OF PREFERRED EMBODIMENTS

Figure 1:
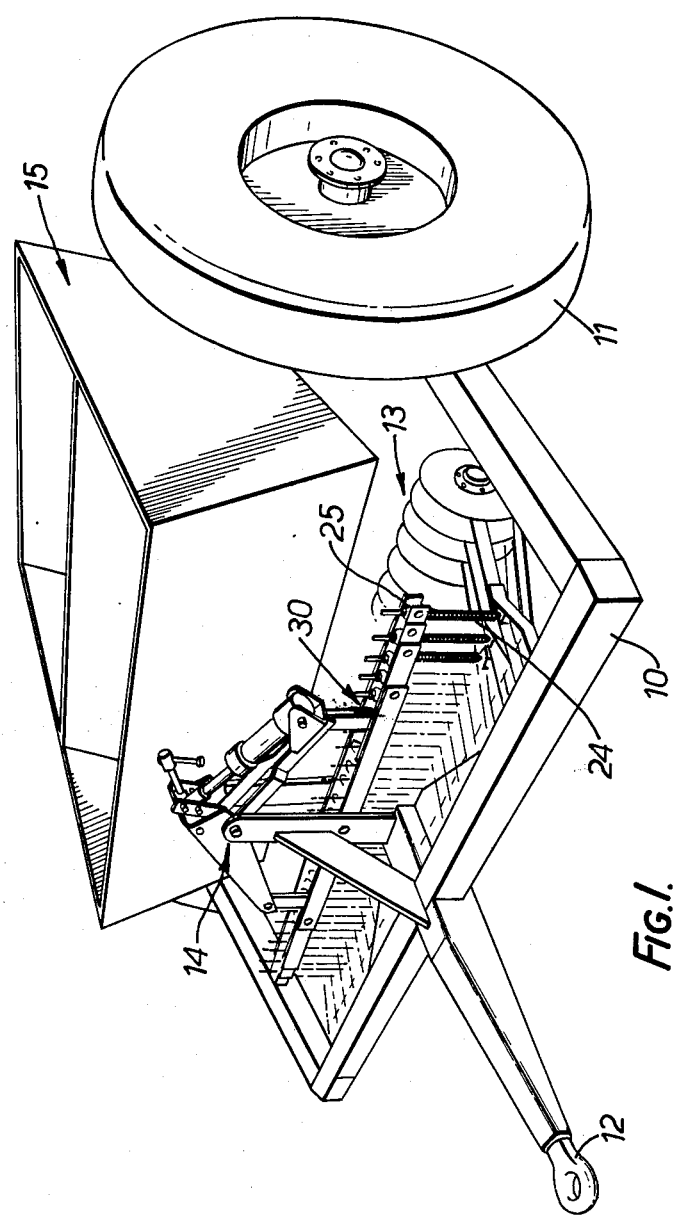
FIG. 1 is a schematic perspective view of a seed drill embodying the invention.
Figure 2:
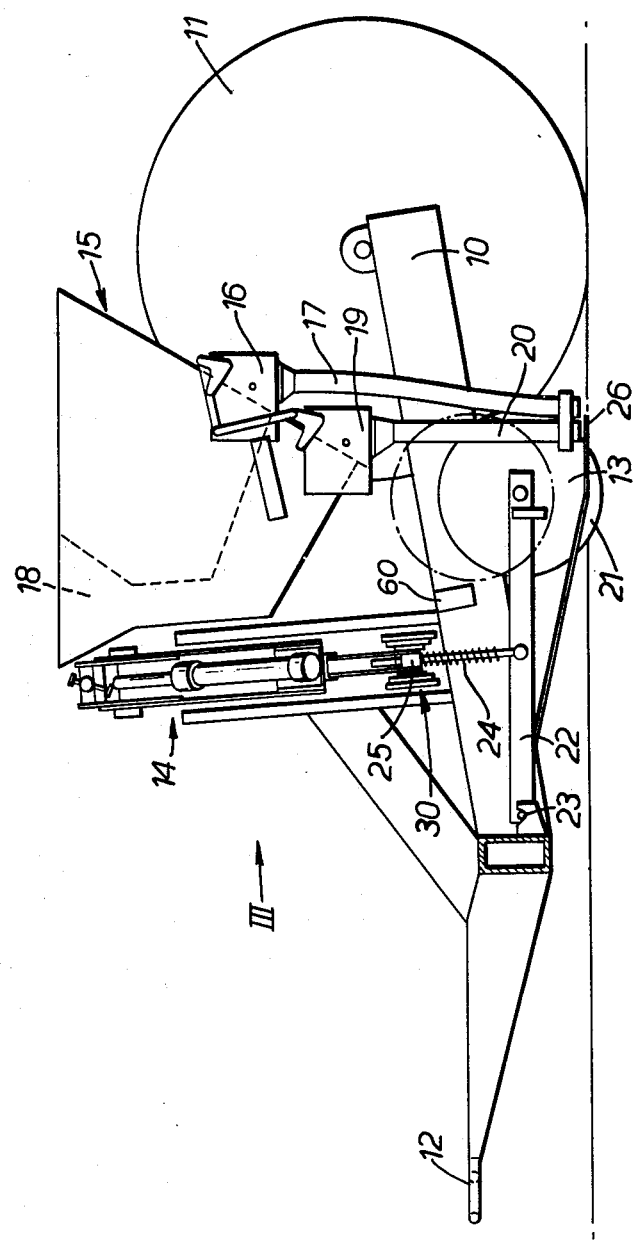
FIG. 2 is a schematic side elevation of the device of FIG. 1.

Referring first to FIGS. 1 and 2, there is shown a seed drill comprising a chassis 10 provided with wheels indicated schematically at 11 by which it may be supported above the ground, and with a towing attachment 12 by which it may be towed behind a tractor vehicle.

A plurality of ground engaging implements in the form of seed drilling cutter assemblies 13 are movably mounted on the chassis 10 and a mechanism indicated generally at 14 is provided for raising and lowering the cutters 13, and applying a suitable force to them so that they engage and penetrate the ground to a suitable depth in operation.

The chassis 10 also carries a hopper 15 for seeds to be drilled into the ground. A metering mechanism 16 is provided at an outlet from the hopper and feed channels indicated at 17 are provided to feed seeds from the mechanism 16 to the individual cutting devices 13 so that they are inserted in the ground.

The hopper 15 may be split, as shown in this embodiment, to provide a second compartment 18 therein for fertiliser, and a second metering mechanism 19 and array of feed chutes 20 provided to feed the fertiliser to the cutting implement 13 so that fertiliser is placed in the ground together with the seeds.

Each cutting implement 13 comprises a cutting disc 21 which is arranged in known fashion per se to cut a narrow furrow or slit in the ground to receive seeds, and where appropriate fertiliser. The disc 21 is rotatably mounted at the free end of an arm 22 which is pivotally mounted about an axis 23 on the chassis 10. A spring loading device indicated at 24 comprising a coil compression spring arranged around a guide rod is provided for each pivot arm 22. The arrangement is such that when the top of the coil compression spring is forced downwards on the guide rod by means of a collar indicated at 25, the arm 22 is forced to pivot carrying the cutting disc in a downward direction to engage the ground and penetrate it to a desired depth. Each cutting device 13 is provided with skids indicated at 26 which are adjustable relative to the arm 22, and arranged to control the depth to which the cutting disc 21 penetrates.

It will be appreciated that where the cutting disc 21 is required to penetrate to a greater depth for a particular sowing situation, or the ground over which the device is operating is harder, than a greater compressive force must be produced in the coil spring of the loading device 24 to achieve this. Alternatively where a lesser depth of penetration is required, or the ground is softer, then a lesser force is required to be produced in the coil spring of the loading device 24.

The mechanism 14 is arranged to provide for these requirements, and at the same time to provide means for raising and lowering the cutting devices 13 between an inoperative position clear of the ground and an operative position in which they are loaded against the ground by the loading devices 24.

Figure 3:
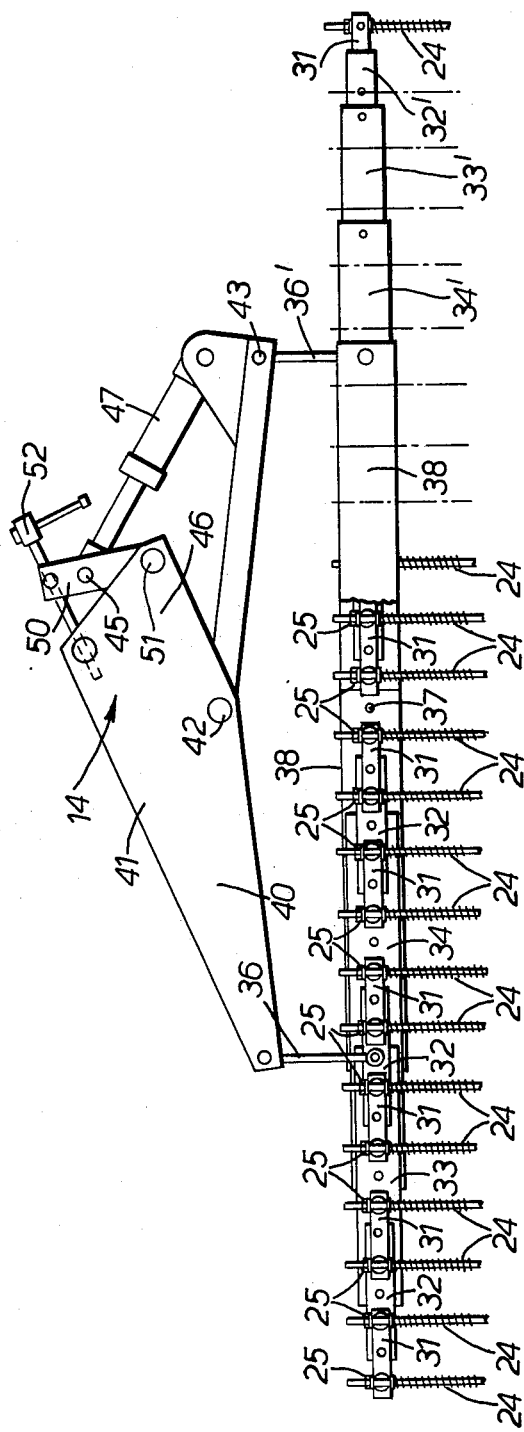
FIG. 3 is a view on the arrow III of FIG. 2.

The mechanism 14 as best seen in FIGS. 1 and 3 comprises a raising and lowering device which is mounted on the chassis 10 and operative upon a loading beam indicated generally at 30.

The cutting devices 13 of which there are twentyfour in this embodiment are arranged in pairs, and the collars 25 of each pair are pivotally mounted at respective ends of a balance beam 31. The balance beams 31 on the left-hand side of the machine are mounted at their mid points upon further balance beams 32 two of which in turn are mounted about their mid points on a further balance beam 33. The balance beam 33 is pivotally mounted by its mid point on one end of a final balance beam 34 which in turn is pivotally mounted at an intermediate point indicated at 35 to the lower end of a link 36. For stability purposes the pivot point 35 is connected to a pivot point 37 on the chassis 10 by means of a pivotal link indicated at 38. The other further balance beam 32 is also pivotally mounted by its mid point, but on the other end of the final balance beam 34, the point 35 being chosen in relation to the pivot points of the beam 33 and other beam 32 so that a downward force on the link 36 is equally distributed between the beams 31 and thus the implements 12. The arrangement described above extends to one side of the chassis 10 from the centre line of the device and is repeated from the centre line on the other side of the chassis 10 with balance beams 31', 32', 33' and 34', with a pivot point 35', a link 36' and a pivotal link 38'. The assembly of balance beams described above forms the cross member indicated generally at 30.

Thus it can be seen that if a downward force is applied equally to the links 36 and 36' this force will be distributed equally between the collars 35 and thus the coil springs of the loading devices 24 of the various drilling devices 13.

The link 36 is pivotally mounted on one arm 40 of a bell-crank like member indicated generally at 41 which is in turn pivotally mounted on the chassis 10 about an axis indicated at 42. The link 36' is pivotally mounted to the outer end 43 of a pivotal link 44 which is also pivotally mounted on the chassis 10 about the axis 42. A pivot point 45 is established on the other arm 46 of the bell-crank like member 41 and a fluid pressure operated piston cylinder device 47 is pivotally connected to be operative between the pivot point 45 which may be fixed and the outer end 43 of the pivot link 44. Thus it can be seen that operation of the device 47 will pivot the bell-crank like member 41 and the pivot link 44 in such fashion as to raise or lower the links 36 and 36', and thus the cutting devices 13. The arrangement is such that the device 47 is moved to an outer position to lower the cutting devices and to exert force on the loading devices 24 thus to cause the cutting devices to penetrate the ground.

The device 47, which is preferably supplied with hydraulic fluid under pressure from the tractor vehicle towing the seed drill, is provided with a control circuit (not shown) which includes a pressure limiting device such as a pressure relief valve so that the force applied by the device 47 may be controlled and limited, and thus the force exerted on the cutting devices and their penetration into the ground may be controlled.

In an other arrangement for the loading on the cutting devices in the operative position to be adjusted, the pivot point 45 is made adjustable relative to the pivot point 42 on the bell-crank like member 41. This is achieved by establishing the pivot point 45 on an adjustment arm 50 pivotally mounted on the other arm 46 of the bell-crank like member 41 at a point 51. A screw mechanism indicated at 52 is provided for adjusting the angular position of the adjustment arm 50 on the bell-crank like member 41 and holding it in any given adjusted position. With this arrangement, the control circuit for the device 47 is arranged so that on lowering the discs the device 47 is always moved fully to its outermost position.

It will be seen that by moving the pivot point 45 relative to the pivot point 42, the downward travel of the links 36 and 36' achieved by extending the device 47 to its outermost extent can be adjusted.

FIGS. 4, 5 and 6 illustrate in a and b figures respectively the raised and lowered positions of the mechanism 14 for minimum intermediate and maximum downward movement of the links 36 and 36', and thus minimum intermediate and maximum force applied to the cutting devices.

It will also be noted that the adjustment of the adjusting arm 50 further achieves an adjustment in the mechanism advantage of the mechanism operative between the device 47 and the links 36 and 36' so that when the maximum applied loading on the cutting devices is required, the mechanical advantage is at its greatest.

It will be further seen that where the minimum movement of the links 36 and 36' is required, that is to say in the minimum loading situation, the stroke of the device 47 required for movement between the totally raised and fully loaded situation is also minimised. This is beneficial in operation of the device because the fluid pressure operated device 47 is driven in use from the hydraulic supply system of the tractor vehicle which is invariably at substantially constant flow rate, and thus the arrangement in minimising the stroke required minimises the time involved in lifting the cutting devices at the end of a run across a field.

The chassis 10 includes a cross beam indicated at 60 which engages the arms 22 of the cutting devices to limit the upward movement thereof thus to define the upper position of the cutting devices. The device 47 is operated to lift the cutting devices until their arms bear against the cross beams 60. The upward movement is transmitted from the collars 25 to the arms 22 of the cutting devices by means of the guide rods provided for the coil springs of the loading devices 24.

Figure 7:
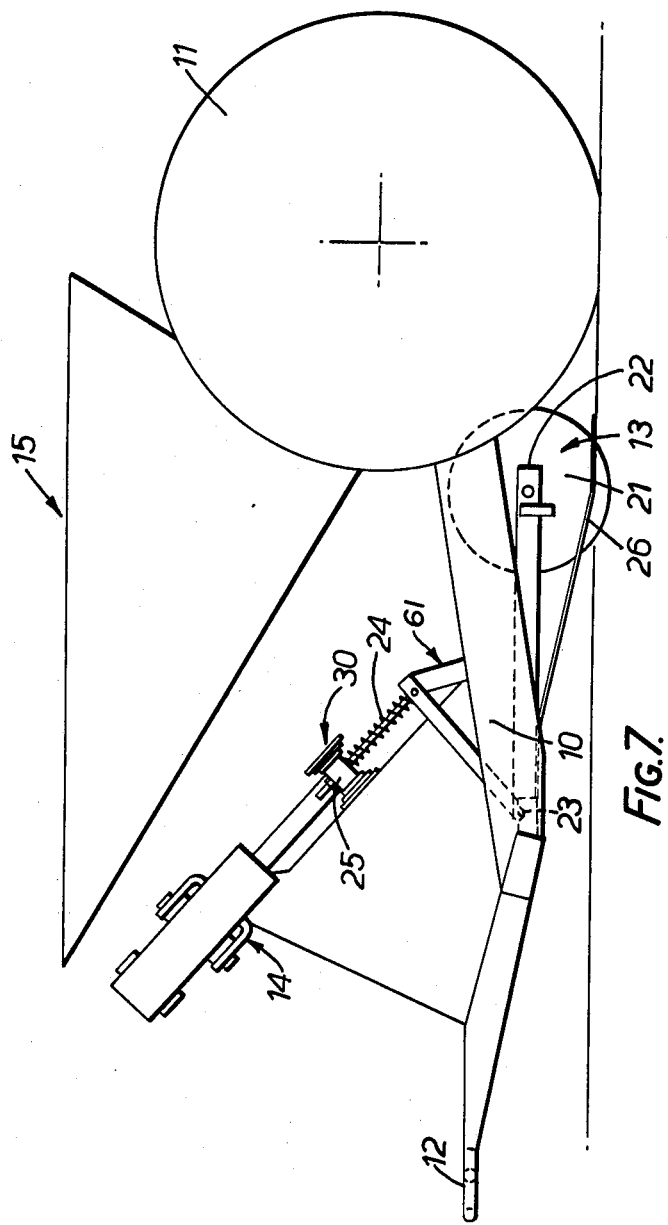
FIG. 7 is a view corresponding to that of FIG. 2 showing an alternative arrangement of the mechanism.

Thus it can be seen that the invention provides an improved raising and lowering mechanism for the cutting devices which is not only applicable to seed drilling implements but could be used to raise and lower other ground engaging and treating implements on such an agricultural device.

Where it is required to provide a larger hopper capacity, the arrangement shown in FIG. 7 may be adopted in which the mechanism 40 is tilted over, and the loading devices 24 act upon the arms 22 of the cutting devices through the intermediary of angle structures indicated at 61. In other respects the arrangement of FIG. 7 operates in an exactly similar fashion to that described above.

In the arrangement described above the balance beam 31 is provided with two final balance beams 34 and 34' arranged on either side of the centre line. In some cases, determined by the number of cutting devices fitted, it may be convenient to have a single final balance beam pivotally mounted at one end on the chassis 10 at one side and pivotally connected to the mid point of the last but one balance beam at the other end. Such an arrangement would thus be similar in configuration to half the balance beam 31 shown in the drawings, centred about the centre line of the chassis. In such an arrangement the piston and cylinder device 47 would be operative between the chassis 10 and the final balance beam.

Figure 8:
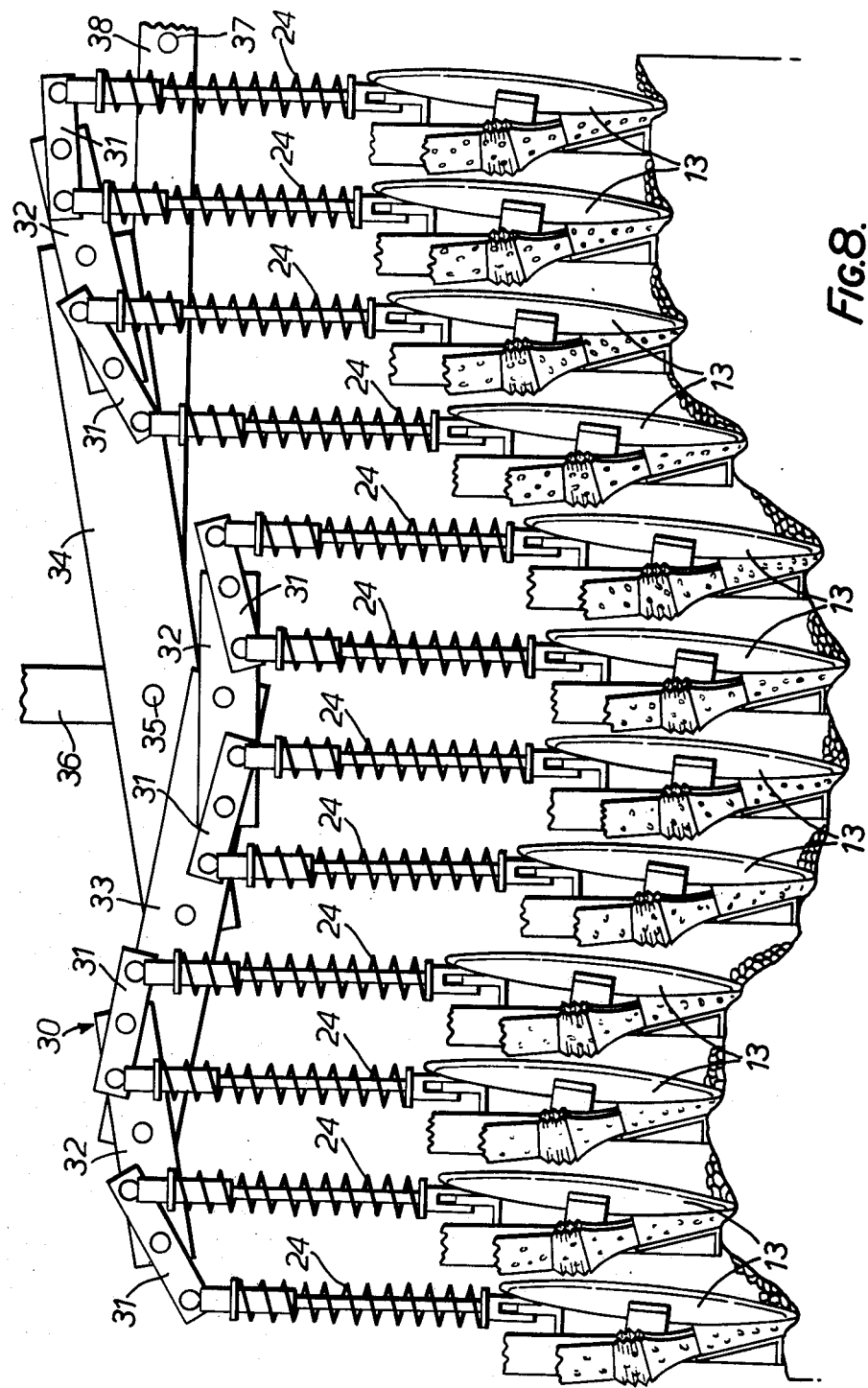
FIG. 8 is a similar view to FIG. 3 showing the device in use.

FIG. 8 shows a view similar to that of FIG. 3, illustrating schematically the device in operation with the various implements 13 engaging over rough ground and the balance beam 30 compensating for that rough ground.

While the above discussion has been directed to an agricultural device having twenty-four ground treating devices, it will be appreciated that if the number of ground treating devices is a power of two, such as a device having thirty-two ground treating devices, then there will be an arrangement in which there are two balance beams 33 carried on the final beam 34 which will then be pivoted by its mid point at the pivot point 35. The two balance beams 33 in that case will each have two balance beams 32 which in turn will have two balance beams 31. The arrangement would be mirrored on either side of the pivot point 37 as discussed above. Again if it is desired to make a machine with say sixteen implements, then again a half device with a single final balance beam pivoted from one side of the chassis may be used.

Figure 9:
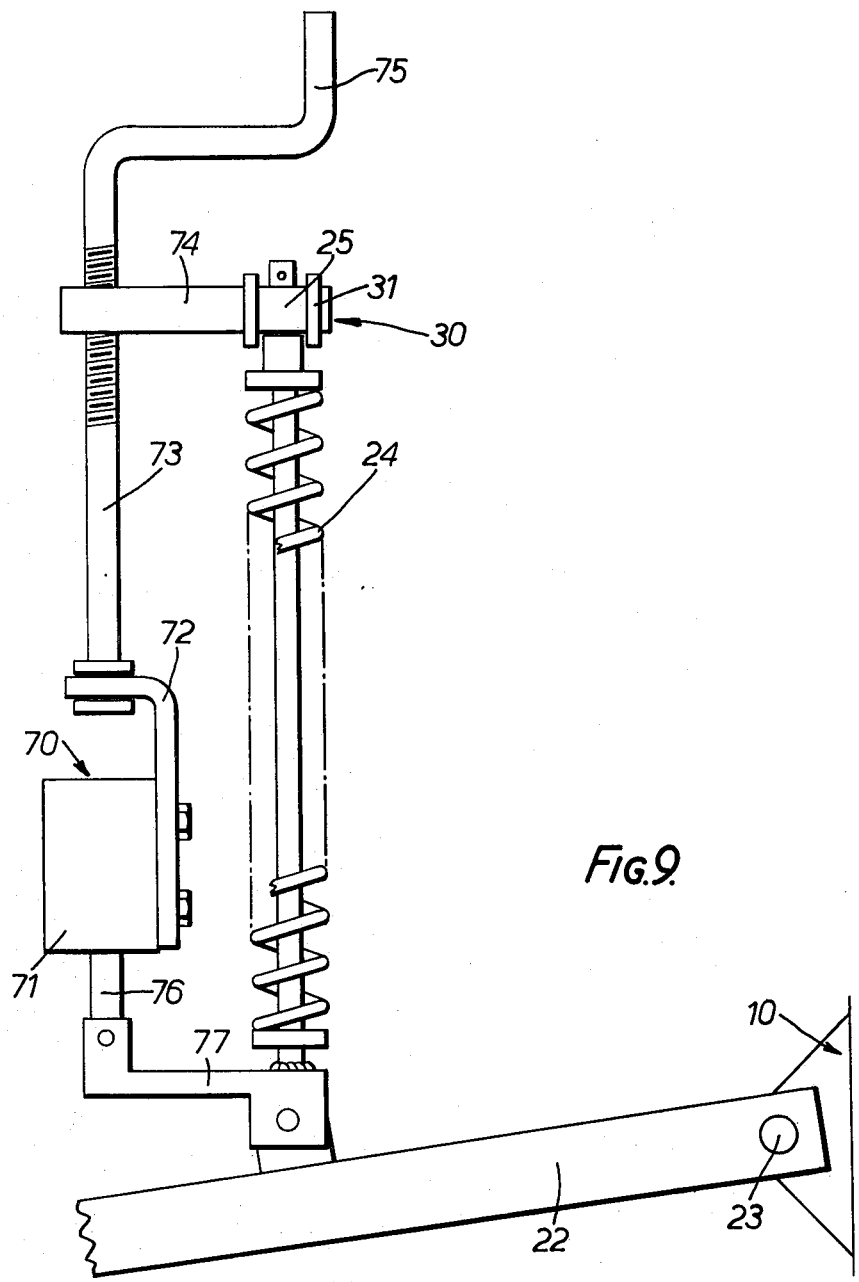
FIG. 9 is a side view of one of the spring units of FIG. 1.

FIG. 9 shows a side view of the spring unit arranged between the balance beam 30 and an outer one of the ground treating devices 13. A hydraulic valve shown generally at 70 is mounted by its body 71 on a bracket 72 which in turn is carried on a screw-threaded rod 73 which is threaded into an extension 74 of the respective collar 25. Rod 73 is provided with a handle 75 so that it may be rotated, thus adjusting the height of the bracket 72, and with it the valve body 71, relative to the collar 25. The spool 76 of the hydraulic valve 70 is attached to a bracket 77 which is rigidly attached to the respective guide rod so that it moves with that guide rod. Thus it can be seen with this arrangement, the valve 70 may be adjusted in position so that for a chosen compression of the spring unit 24 equatable to a given loading on the implement 13, the spool 75 is in a neutral position, with increasing or decreasing loading in the spring unit 24 resulting in operation of the valve 70 in an appropriate sense.

Figure 10:
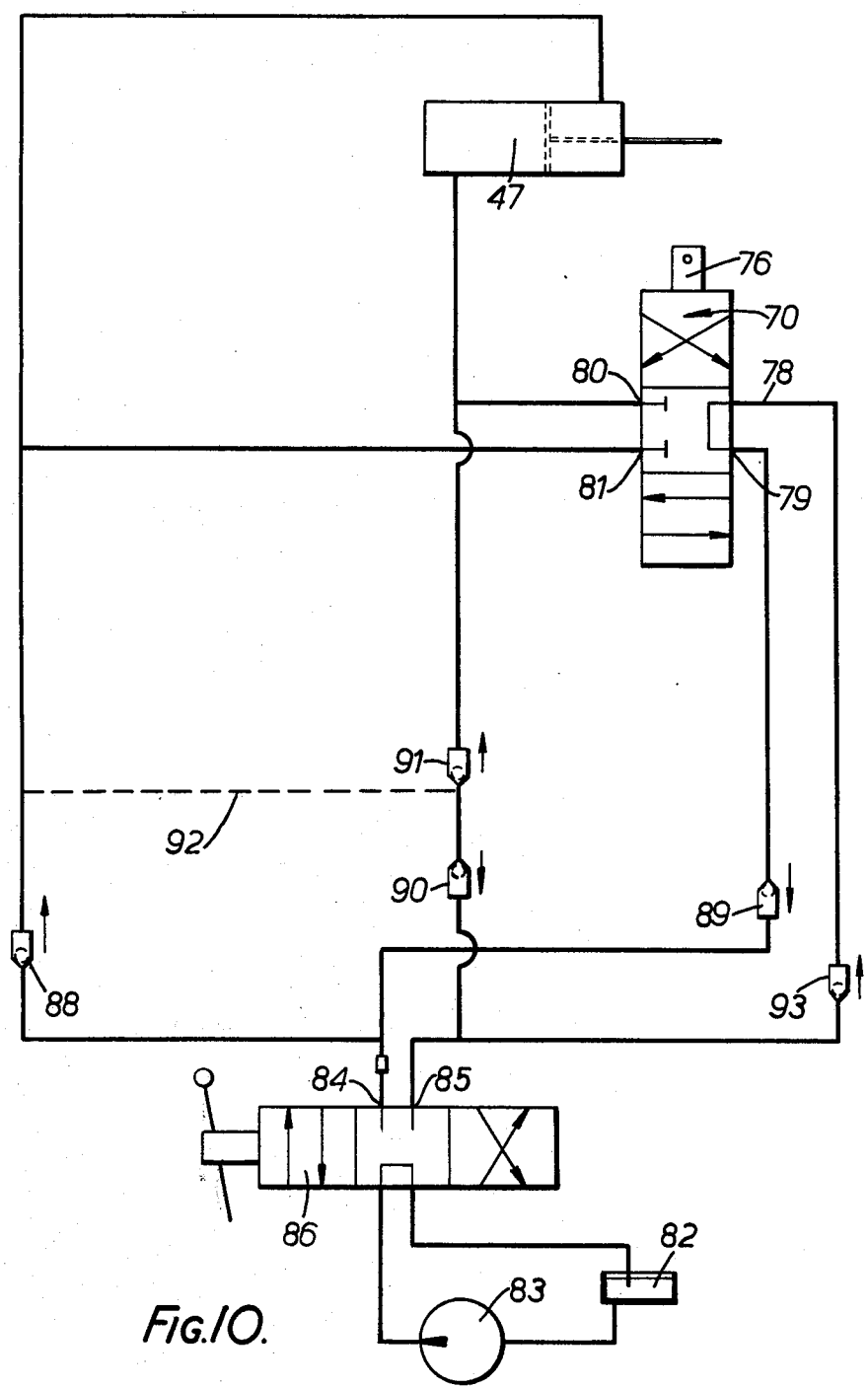
FIG. 10 is a hydraulic control circuit associated with the spring unit of FIG. 9.
Figure 11:
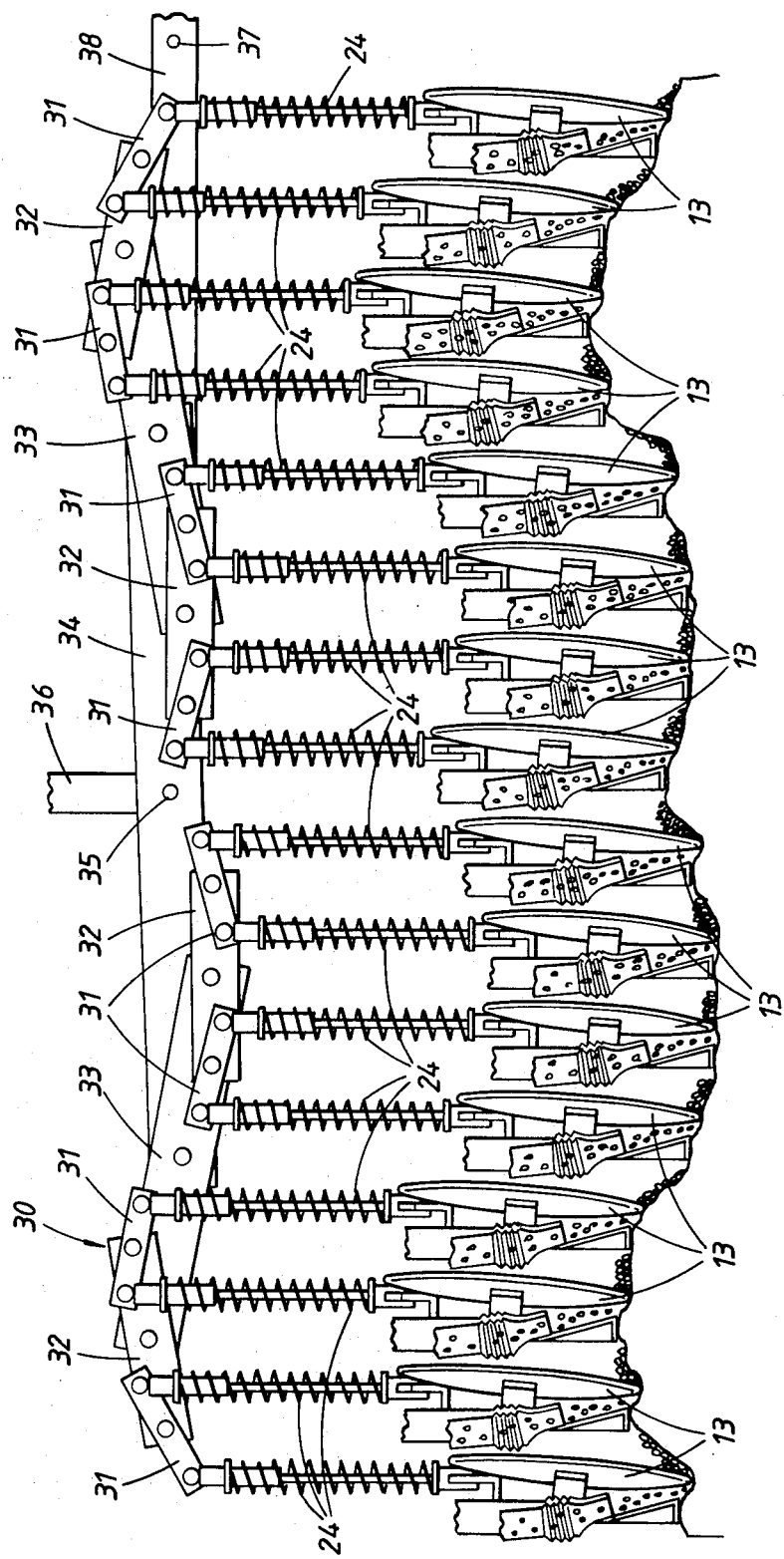
FIG. 11 is a view similar to FIG. 8, but showing a slightly modified embodiment of the invention in use.

The provision of the valve 70 on one of the units 24 is optional, but can be utilized with the hydraulic circuit shown in FIG. 10 to provide an accurate control of the loading on the implements 13. It will be appreciated that since the balance beam 30 operates to equalise the load on all the implements 13, if the valve 70 is used to control the fluid pressure operated device 47 in such fashion as to maintain a given compression in the spring device 24 associated with it, the same loading will be produced in each of the spring devices 24 with the consequence that all the tynes will be equally loaded with that given force.

FIG. 10 shows in schematic outline the hydraulic circuit for achieving such a situation. Valve 70 is arranged so that when its spool 76 is in a central position the two inlets 78 and 79 are connected together and the two outlets 80 and 81 are cut off. If the spool is moved by the mechanism of FIG. 9 to a situation where the implement is higher than is desired, i.e. the load is to be increased, it is arranged that the spool 76 is moved to connect the inlet 78 to the outlet 80, and the inlet 79 to the outlet 81. On the other hand if the implement is in a position where the load is too high, i.e. the implement should be raised slightly, then the spool is moved to connect the inlet 78 to the outlet 81 and the inlet 79 to the outlet 80.

A hydraulic reservoir 82 and pump 83 supplied with hydraulic fluid from the reservoir are provided in known manner per se on the tractor vehicle together with a manually operated valve which is provided with ports 84 and 85, the arrangement being such that the output of the pump can be supplied to the port 84 when the handle is in a raised position, with the port 85 being connected to the reservoir 82, or vice versa when the handle is in a lower position.

The port 84 is connected to that side of the fluid pressure operated device 47 which raises the inplements by way of a check valve 88. It is also connected by that same check valve to the outlet 81 of the valve 70. The port 84 is connected by a check valve 89 to the inlet 79 of the valve 70.

Port 85 of the valve 86 is connected by way of a check valve 90 and a pilot operated check valve 91 to that side of the device 47 which lowers the implements, and also to the outlet 80 of th valve 70. The pilot operated check valve 91 receives pilot pressure by a line 92 from a point upstream of the check valve 88. The port 85 of the valve 86 is also connected by way of a check valve 93 to the inlet 78 of the valve 70.

It can be seen that in operation movement of the handle of the valve 86 to supply the output of the pump 83 to the port 84 will supply hydraulic fluid to the raised side of the device 47. In this situation the lower side of the device 47 can exhaust to the port 85 and back to the reservoir by way of the check valve 91, which will be then opened by pressure on the line 92, and thence by way of the check valve 90.

When the handle of the valve 86 is in the lower position, that is to say the output of the pump is supplied to the port 85, and assuming for the moment that the device is already in the lowered position with the implements 13 in engagement with the ground, if the spool 76 is in a position indicative of the correct loading of the implements, the hydraulic fluid will be circulated through the valve 70 back to the port 84 and to the reservoir. If the spool 76 is in a position indicative of a light loading of the implements, i.e. the device is to be lowered, then the supply from the pump 83 is connected by way of the port 79 to the outlet 80 of the valve 70 thus to lower the device, and the oil pressure which would then be created in the raised side of the device 47 is released by the valve 70 through the port 81 being connected to the port 78 and thus back to the reservoir 82.

If the spool 76 is in a position indicative of the implement being too heavily loaded, the port 79 of the valve 70 is connected to the port 81 and thus to the raised side of the device 47 so that the implements are raised to reduce the loading even though the handle of the valve 76 is in the lower position.

Thus it can be seen that operation of the valve 70 will control the loading of the implements by controlling the supply of fluid to the device 47.

If one assumes now that the implements are in the raised position lifted away from the ground, it will be remembered that the spool 76 will be in such a position that it indicates that the implement should be lowered to increase the loading on them. It can then be seen that operation of the handle of the valve 86 to the lower position, will cause a supply of oil to lower the implements until such time as the loading moves the spool 76 to the neutral position in the valve 70 indicating correct loading.

Thus it can be seen that the circuit provides for not only the raising and lowering of the implements into and out of use on operation of the valve 86, but for the control of the loading when the implements are in the lower position by operation of the valve 70.

What I claim as my invention and desire to secure by Letters Patent is:

1. An agricultural ground treating device arranged to be towed over the ground, comprising a chassis and a plurality of ground engaging implements movably mounted on the chassis, and loading means operative between the chassis and the implements to cause the implements all to engage the ground with a substantially equal force, in which said loading means comprises a pivoted beam arrangement having a number of first balance beams equal to half the number of said implements each end of each of said first balance beams being pivotally connected to a respective one of a pair of said implements, a number equal to half the number of first balance beams of second balance beams each end of each of said second balance beams being pivotally connected to the mid point of a respective first balance beam, a pair of third balance beams each end of each of said third balance beams being pivotally connected to the mid point of a respective second balance beam, and a final balance beam each end of said final balance beam being pivotally connected to the mid point of a respective one of said third balance beams, the final balance beam being movably mounted on the chassis, and fluid pressure operated means operative on the final balance beam to urge the beam arrangement and the implements connected to it towards the ground.

2. An agricultural ground treating device arranged to be towed over the ground, comprising a chassis and a plurality of ground engaging implements movably mounted on the chassis, and loading means operative between the chassis and the implements to cause the implements all to engage the ground with a substantially equal force, in which said loading means comprises a pivoted beam arrangement having a number of first balance beams equal to half the number of said implements each end of each of said first balance beans being pivotally connected to a respective one of a pair of said implements, a number equal to half the number of first balance beams of second balance beams each end of each of said second balance beams being pivotally connected to the mid point of a respective first balance beam, four third balance beams each end of each of said third balance beams being pivotally connected to the mid point of a respective second balance beam, and a pair of final balance beams each end of each of said final balance beams being pivotally connected to the mid point of a respective one of said third balance beams, the final balance beam being movably mounted on the chassis, and fluid pressure operated means operative on the final balance beams to urge the beam arrangement and the implements connected to it towards the ground.

3. An agricultural ground treating device arranged to be towed over the ground, comprising a chassis and a plurality of ground engaging implements movably mounted on the chassis, and loading means operative between the chassis and the implements to cause the implements all to engage the ground with a substantially equal force, in which said loading means comprises a pivoted beam arrangement having a number of first balance beams equal to half the number of said implements each end of each of said first balance beams being pivotally connected to a respective one of a pair of said implements, a number equal to half the number of first balance beams of second balance beams each end of each of said second balance beams being pivotally connected to the mid point of a respective first balance beam, a pair of third balance beams each end of each of said third balance beams being pivotally connected to the mid point of a respective second balance beam, and a final balance beam one end of said final balance beam being pivotally connected to the mid point of a respective one of said third balance beams and the other end of said final balance beam being pivotally connected to the mid point of one of the remaining second balance beams, the final balance beam being movably mounted on the chassis, and fluid pressure operated means operative on the final balance beam to urge the beam arrangement and the implements connected to it towards the ground.

4. An agricultural ground treating device arranged to be towed over the ground, comprising a chassis and a plurality of ground engaging implements movably mounted on the chassis, loading means operative between the chassis and the implements to cause the implements all to engage the ground with a substantially equal force, in which said loading means comprises a pivoted beam arrangement having a number of first balance beams equal to half the number of said implements, each end of each said first balance beams being pivotally connected to a respective one of a pair of said implements, a number equal to half the number of first balance beams of second balance beams with each end of each of said second balance beams being pivotally connected to the mid point of a respective first balance beam, a pair of third balance beams with each end of each of said third balance beams being pivotally connected to the mid point of a respective second balance beam, and a pair of final balance beams with one end of each of said final balance beams being pivotally connected to the mid point of a respective one of said third balance beams and the other end of each of which is pivotally connected to the mid point of one of the remaining second balance beams, the final balance beams being movably mounted on the chassis, and fluid pressure operated means operative on the final balance beams to urge the beam arrangement and the implements connected to it towards the ground.

5. An agricultural ground treating device as claimed in claim 4, in which each said implement is provided with a guide rod, a collar slidable on the guide rod and a compression spring active between the collar and the implement, and said first balance beams are so pivotally connected to said collars to urge the implements towards the ground by way of their respective springs.

6. An agricultural ground treating device as claimed in claim 3, in which hydraulic valve means is provided associated with one of said implements, to be responsive to the degree of compression in the compression spring of that implement, and a hydraulic circuit is provided to control the fluid pressure operated device in accordance with the operation of said valve means whereby to maintain that compression to a preset value and thus maintain the force with which the implements engage the ground constant.

7. An agricultural ground treating device as claimed in claim 6, in which said valve means comprises a spool valve the body of which is adjustably mounted on the collar associated with said one implement, and the spool of which is connected to the respective guide rod.

8. An agricultural ground treating device as claimed in claim 4, in which the final balance beams are each movably mounted on the chassis by means of a respective link pivotally connected between the chassis and the final balance beams.

9. An agricultural ground treating device as claimed in claim 8, in which the links are each pivotally mounted on the chassis at a point on the longitudinal axis of the chassis.

10. An agricultural ground treating device as claimed in claim 4 in which said fluid pressure operated means comprises a piston and cylinder device, a bell-crank like member pivotally mounted on the chassis and having one arm connected to one of said final balance beams, and the other arm connected to the piston and cylinder device, and a pivot link pivotally mounted on the chassis at one end and connected at the other end to the other final balance beam and the piston and cylinder device, whereby operation of the piston and cylinder device causes relative angular movement between the bell-crank member and the pivot link to so urge the implements towards the ground.

11. An agricultural ground treating device as claimed in claim 10, in which the point at which the piston and cylinder device is pivotally connected to said second arm of the bell-crank is adjustable with respect to the axis about which the bell-crank pivots on said chassis.

12. An agricultural ground treating device as claimed in claim 10, in which means is provided for limiting to a set value the fluid pressure supplied to the piston and cylinder device to move it in a direction to urge the implements towards the ground.

13. An agricultural ground treating device as claimed in claim 4, in which the fluid pressure operated means is reversible to lift the implements clear of the ground.

14. An agricultural ground testing device as claimed in claim 4 in which there is a single final balance beam which is pivotally located on said chassis, and the fluid pressure operated means is operatively arranged between said chassis and said final balance beam.

15. An agricultural ground treating device as claimed in claim 14 in which the final balance beam is pivotally located at a point on one side of the longitudinal axis of the chassis.

16. An agricultural ground treating device as claimed in claim 14, in which the fluid pressure operated device is a piston and cylinder device.

17. An agricultural ground treating device as claimed in claim 1, in which the ground treating implements are seed drills, and comprising a first hopper for seeds mounted on the chassis, and means for feeding seeds from the hopper to said drills.

18. An agricultural ground treating device as claimed in claim 17, comprising a second hopper for fertiliser mounted on the chassis, and means for feeding fertiliser from the hopper to said drills.

19. An agricultural ground treating device as claimed in claim 18, in which said second hopper is in a common housing with said first hopper, a baffle wall being provided in the housing to separate them.

* * * * *